REVERSIBLE COUNTER

Filed March 23, 1956 2 Sheets-Sheet 1

INVENTORS.
Theodore P. Bothwell
& Grant W. Booth
BY
Morris Rabkin
ATTORNEY.

Feb. 18, 1958 G. W. BOOTH ET AL 2,823,856

REVERSIBLE COUNTER

Filed March 23, 1956 2 Sheets-Sheet 2

INVENTORS.
Theodore P. Bothwell
& Grant W. Booth
BY Morris Rabkin
ATTORNEY.

United States Patent Office 2,823,856

Patented Feb. 18, 1958

2,823,856

REVERSIBLE COUNTER

Grant W. Booth and Theodore P. Bothwell, Collingswood, N. J., assignors to Radio Corporation of America, a corporation of Delaware Application March 23, 1956, Serial No. 573,509

18 Claims. (Cl. 235—61)

This invention relates to a reversible counter.

Binary counters and registers find extensive uses, for example, in a variety of digital computing applications, in radiation measurement, in time measurement, and in the address and control circuits of digital computers to mention a few. For many of these uses, and often in other uses of counters, it is desirable to count and sense the resulting output at rates as high as possible.

It is also desirable to construct such counters and registers from a minimum number of standard components, thus to achieve standardization and minimize construction costs. It is particularly desirable to construct transistor counters and registers using transistors of a relatively low frequency response as compared to the frequency response of other transistors. With such transsistors, both the carry propagation delay and impedance matching between the several stages of the counter (or register) present problems.

Accordingly, it is an object of this invention to provide a reversible counter having a high speed carry.

A further object of this invention is to provide an improved high speed counter, which counter may also serve as a register of entry, that is, a register into which an amount may be entered directly, without counting up or down.

Another object of this invention is to provide a high speed counter wherein each stage is identical and iterative.

An additional object of this invention is to provide two basic components from which either a reversible counter or a counter-register of entry may be constructed.

In accordance with this invention, a counter includes a plurality of substantially identical binary stages. Each of these stages includes a triggerable flip-flop and a gate through which a high speed carry signal may pass. An output of each stage is taken from the "one" terminal of each flip-flop. The counter is made reversible by providing means for complementing the binary number registered in the counter, inserting the desired count, and recomplementing the new number now registered in the count. Improved transistor flip-flop and gate circuits may be employed whereby each count is available substantially within the settling time of the flip-flops. By settling time is meant that time required for the flip-flops to change from one state to another.

The novel features of this invention as well as the invention itself, both as to its organization and method of operation, will best be understood from the following description when read in connection with the accompanying drawings, in which like reference numerals refer to like parts, and in which.

Figures 1, 2:
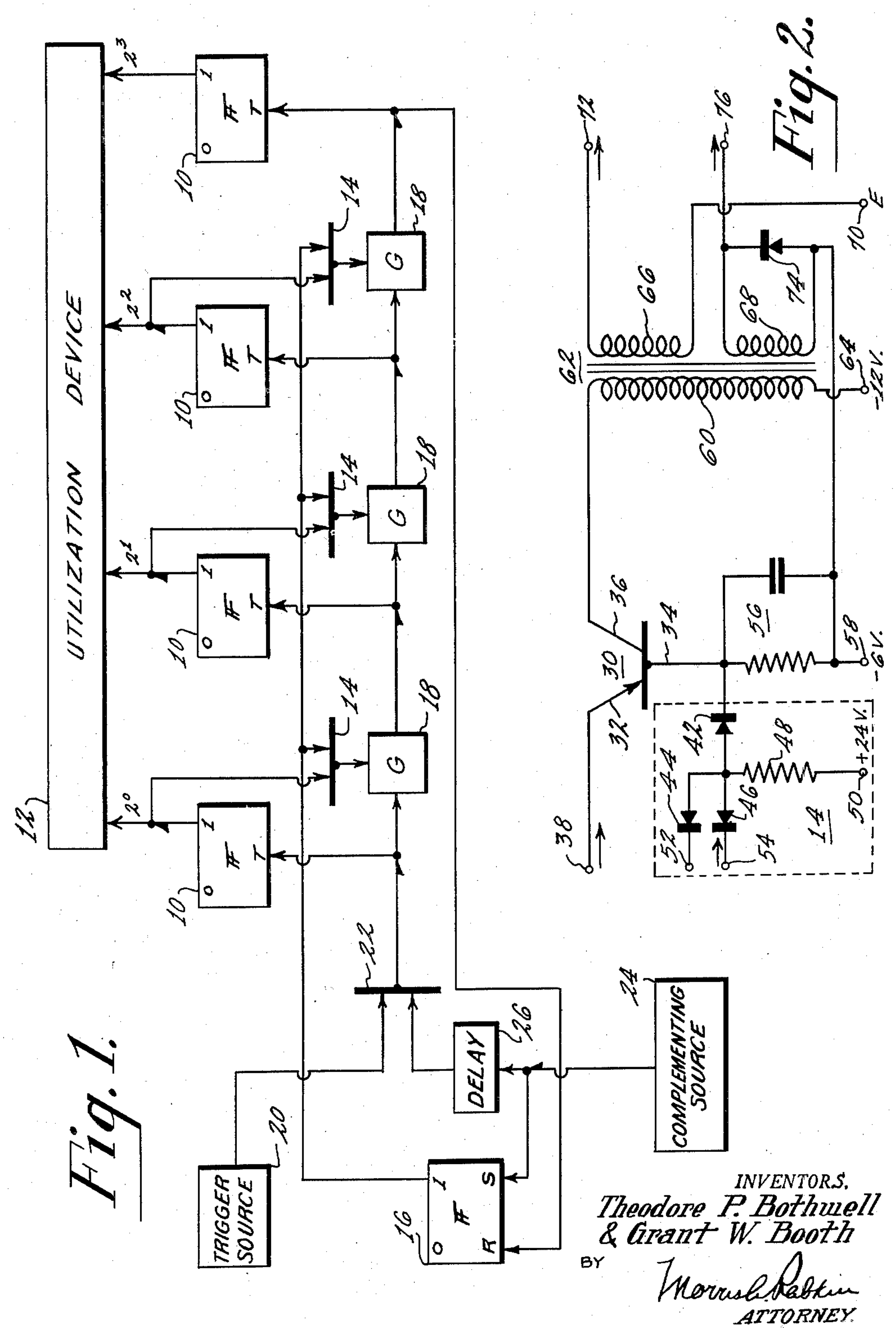
Figure 1 is a block diagram of a reversible counter having a high speed carry, using only two basic components, in accordance with this invention.
Figure 2 is a circuit diagram of a gated transistor pulse amplifier which may be used in the block diagram of Figure 1.

With reference to Figure 1, a four-stage reversible binary counter is shown by a block diagram. Each stage of the counter is substantially identical to any other. Therefore, detailed description of the connections of the first, or $2^0$ stage, is deemed sufficient.

The bistable multivibrator 10 of the first stage of the counter may be of any suitable type, several being well known in the art as, for example, an Eccles-Jordan flip-flop. The flip-flop 10 has two output terminals here designated as the "0" and "1" output terminals, respectively, and corresponding reset and set input terminals. The flip-flop may assume a set condition by application of a high level, or pulse, on the set input terminal S, or the reset condition by the application of a high level or pulse on a reset input terminal R. The outputs associated with the flip-flop circuit are given the Boolean tags of "1" and "0." If the flip-flop is in its set condition (that is, set) the "1" output voltage is high and the "0" output voltage is low. Unless otherwise indicated, the outputs from the flip-flop are taken from the "1" output terminal. If the flip-flop is reset (that is, in its reset condition) the "1" terminal is low and the "0" terminal is high. A flip-flop may also be provided with a trigger terminal T. Application of pulses to the trigger terminal T causes the flip-flop to assume the other condition from the one it was in when the pulse was applied. Each of the flip-flops is indicated by a rectangle labeled with the stylized double F as in Figure 1.

Returning to the flip-flop 10 for the $2^0$ stage in Fig. 1, the "1" output of the flip-flop 10 is coupled to a utilization device 12 and to one input of an "or" circuit 14. "Or" circuits are sometimes referred to as buffer circuits. A complementing flip-flop 16 for the counter is provided and has its "1" output terminal coupled to the remaining inputs of each of the "or" circuits 14. Junctions are indicated by half arrows in the direction of the information flow.

The output of the "or" circuit 14 is coupled to one input of a two-input "and" gate 18. "And" gates, often referred to as coincidence gates, may be of either the well known diode type, or may be a gated pulse amplifier of the type described in connection with Fig. 2. An "and" gate provides an output upon the simultaneous occurrence of all its input pulses, or levels. A trigger input source 20 is coupled through an "or" circuit 22 to the trigger input of the first counter stage flip-flop 10 and to the second input of the first stage "and" gate 18. The first stage "and" gate 18 has the function of propagating the high speed carry from the first to the second stage of the counter of Fig. 1. The output of the first stage "and" gate 18 is coupled to the trigger input of the second stage flip-flop 10 and to the second input of the high speed carry gate 18 for the second stage. Remaining stages of the counter are similar and connected in the same manner with the exception of the last stage which has no high speed carry gate. The high speed carry gate 18 of the next to last stage (here the $2^2$ stage) is coupled to the trigger input of the last stage flip-flop 10 and to the reset input R of the complementing flip-flop 16. A complementing input source 24 is coupled to the set input S of the complementing flip-flop 16, and through a delay 26 to a second input of the "or" circuit 22. The outputs respectively represent, as indicated, the $2^0$, $2^1$, $2^2$, and $2^3$ binary outputs.

The utilization device 12 may be, for example, an addressing matrix for a memory system having a plurality of discrete memory positions. As another example, the utilization device 12 might be a computing system which employs a count-down process for subtraction of one number from another. Computing systems using this technique are well known to those skilled in the art.

In operation, the source 20 of trigger pulses are the pulses to be counted. The complementing source 24 provides a signal source which effects a reversal in the direction of the count as will be described below. By way of illustration, assume that each of the flip-flops 10 is initially reset. The "0" output of each of the flip-flops 10 is then high. With the application of successive pulses from the trigger source 20 the successive flip-flops 10 count in a binary fashion. Upon the application of the first pulse from the trigger source 20, the flip-flop 10 of the first ($2^0$) counter stage receives a trigger input which reverses its condition from "0" to "1." This same first trigger pulse cannot pass through the first high speed carry "and" gate 18 due to the fact that the first flip-flop of the first stage of the counter was initially in a "0" condition. This first flip-flop 10 requires a finite time to change state (settling time). Before the change of state has occurred, the pulse from the trigger source 20 has subsided.

On the application of a second pulse from the trigger source 20 the state of the flip-flop 10 of the first counter stage is again reversed, this time from the "1" condition to the "0" condition. However, in this case, the second trigger pulse now is allowed to pass through the high speed carry gate 18 of the first counter stage. Again, the state of the first flip-flop does not change until after the second trigger pulse has subsided. Counting in this manner in a forward direction continues so long as desired. Since no change of state is required for carry generation, the time for the carry to propagate from stage to stage of the counter is a function only of the delays in the gate 18. The sum of these delays through the total counter gives a total delay which corresponds to ripple time in a conventional counter or pulse delay in a parallel high speed counter. The total settling time of the counter in the "1111" condition will be given by four times the ripple time plus the full time for change of state of the flip-flops.

The fast operation of the counter is thus related to the delay inherent in the turn-over time of the flip-flops.

When it is desired to reverse the count, the binary number present in each of the flip-flop stages of the counter is reversed, that is, complemented in the manner described below. Successive pulses from the trigger source 20 are now added to the complement of the original number present in the counter. This effectively produces a count in a reverse direction. Then, when the reverse count is again to be read, the counter is recomplemented to present an output indicative of the desired result.

Complementation is achieved by a novel use of the high speed carry gates 18. When a pulse occurs from the complement source 24, the complementing flip-flop 16 is set, that is, the "1" output is high and each of the carry gates 18 is primed. After a delay in delay circuit 26, the complementing pulse passes through each of the carry gates 18, primed by the high "one" output of the complement flip-flop 16. The complement pulse now triggers each of the flip-flops 10. Hence, the complement pulse from the complementary source 24 appears at the trigger input T of each flip-flop 10 regardless of the state of the preceding flip-flop, by the use of the "or" circuit 14 through which the high speed gates 18 are primed. The output of the last carry gate 18 of the counter returns the delayed complementing pulse to reset the complementing flip-flop 16. Each of the counter stages is now effectively complemented.

Once complemented, successive pulses to be counted in the reverse, or subtractive, direction from the trigger source 20 are now applied in a normal manner and effectively added to the complement of the number originally appearing in the counter as described above. When the reverse count is to be read, another complementing pulse recomplements the counter in the manner just described above and the resulting output is available from the "1" output of each of the flip-flops 10 of the counter. By this scheme, either a direct or complementary reading of the counter is available from a single set of outputs of the counter. For a direct reading, the "one" outputs of the flip-flops may be read directly, and when the counter is complemented, the complementary reading is obtained from the same "one" outputs.

The counter of Figure 1 employs primarily two basic circuits, namely, a flip-flop and a gate. A transistor circuit, which is particularly advantageous for use in one of these components, namely, the gate, is the transistor gated pulse amplifier shown in Figure 2. More specifically, this gated pulse amplifier combines the function of each of the "and" gates 18 and "or" circuits 14 of Figure 1. The "or" circuit 14 is shown within the dotted lines in Figure 2 and is given the designation 14, corresponding to the "or" circuit 14 of Figure 1. For the "or" circuit 14 of Figure 2, negative inputs are required. Accordingly, the priming input to "or" circuit 14 must be negative in value for the "and" gate of Figure 2 to be primed as will be set forth in detail below.

The gated pulse amplifier of Figure 2 comprises a junction transistor 30 having an emitter 32, a base 34, and a collector 36. This transistor is of the P–N–P type. The emitter 32 is connected to a trigger or time pulse input terminal 38 from which, for example, the trigger pulses from the trigger source 20 (Fig. 1) may be received (positive trigger pulses are required for the emitter 32). The base 34 of the transistor 30 is coupled to receive the output of the "or" circuit 14.

The "or" circuit 14 includes an isolation diode 42, which may be a crystal diode, having its cathode coupled to the base 34 of the transistor 30. The anode of the diode 42 is coupled to the anodes of two "or" circuit diodes 44 and 46, respectively, and through a resistor 48 to a source of supply voltage 50 which is positive with respect to a "ground" reference potential (not shown). The cathodes of diodes 44 and 46, respectively, are connected to operation level input terminals 52 and 54. As will be more fully described below, these input terminals 52 and 54 receive negative voltage level inputs from the "1" output of any of the flip-flops 10 (Fig. 1) or the "1" output of the complementing flip-flop 16 (Fig. 1). The base 34 of the transistor 30 is also coupled through a parallel connected resistance-capacitance combination 56 to a source of potential 58 negative with respect to ground.

The collector 36 of the transistor 30 is coupled through a primary winding 60 of a transformer 62 to a source of potential 64 negative with respect to ground. Each of these sources 50, 58 and 64 may, for example, be batteries, or suitable rectifiers. The voltage values found suitable in one practical circuit are indicated on the drawing. The transformer 62 has two secondary windings 66 and 68. One terminal of the secondary winding 66 is connected to a source of voltage 70. The other terminal of the secondary winding 66 is connected to a terminal 72 which corresponds to the trigger input of the flip-flop 10 of Figure 1.

A crystal diode 74 in Figure 2 is shunted across the secondary winding 68. The anode of diode 74, at its connection to the secondary winding 68, is coupled to the source of potential 58. The other terminal of the secondary winding 68 and the cathode of the diode 74, are connected to a trigger pulse output terminal 76. The output from this output terminal 76 provides a positive pulse. In the embodiment of Figure 1, for example, the output terminal 76 provides the input to a succeeding gate 18. Thus output of the gated amplifier of Figure 2 provides a negative pulse from the output terminal 72 which is coupled to the trigger input T of the flip-flop 10 (Fig. 1) and a positive pulse from the output terminal 76 (Fig. 2) which is coupled to the input of a succeeding gate 18 (Fig. 1).

In operation, the gating function of the gated pulse amplifier is controlled by the "or" circuit 14 and the trigger input at input terminal 38. Initially, the circuit is quiescent with the voltage level at the input terminals 52 and 54 of such value that the diodes 44 and 46 are non-conducting. The isolating diode 42 is conducting such that the voltage drop across the resistor-capacitor combination 56 reverse biases the emitter-base diode 32—34 of the transistor 30. Application of a negative pulse or voltage level to either of the input terminals 52 or 54 causes the corresponding diode 44 or 46 to conduct, thereby cutting off conduction to the isolating diode 42. Cutting off diode 42, in turn, because of the source 58, decreases the emitter-base voltage difference, and upon the application of a positive trigger pulse at the trigger input terminal 38, the transistor 30 is forward biased between emitter and base electrodes. With proper selection of circuit values (one such selection is, for example, given below) the transistor 30 approaches saturation. The capacitor in the resistor-capacitor combination 56 increases the effective frequency response by allowing the circuit to operate as a grounded base pulse amplifier during the turn-on and turn-off periods of the transistor. These transient effects have little affect upon the circuit during the flat top portion of any trigger pulse.

During the "on" period of the transistor 30, collector current flows through the primary 60 of transformer 62, providing outputs in the secondary windings 66 and 68. These windings are wound such that secondary winding 66 produces at terminal 72, in response to increasing conventional current flow into the primary 60 from collector 36, a negative output. This negative output may be employed to trigger the next flip-flop 10 of Figure 3 as mentioned above described more fully below. The secondary winding 68 provides a positive pulse at terminal 76 in response to a like increasing current, which may be used to produce a trigger pulse to the trigger input terminal 38 of a successive gated pulse amplifier. In Figure 1 only a single output from each of the gates 18 is indicated. If the gated amplifier of Figure 2 is substituted for the gate 18 (Fig. 1) two outputs (not shown) are required, one for the flip-flop 10 and one for the succeeding pulse amplifier 18.

Other logic gating arrangements may be coupled to the base 34 of the transistor 30, as desired, to implement logic arrangements. Also, by the use of an N–P–N transistor and sources of opposite polarity along with the reversal of all diodes, a similar gated pulse amplifier responsive to opposite polarity inputs is available. The following circuit specifications have been found to be particularly advantageous and are included by way of example only. For these circuit specifications the voltages which are applied to the terminals 50, 58, 64 and 70 are +24, −6, −12 and 0 volts, respectively. Resistor 48 is 70,000 ohms, and the resistance-capacitance combination 56 consists of an 8,000 ohm resistor and a 180 micromicrofarad capacitor. The transistors are preferably of the junction type, although other transistors may be used.

A transistor flip-flop may be used to advantage in conjunction with the gated amplifier of Figure 2 as the flip-flop 10 of Figure 1. However, any suitable bistable multivibrator having a trigger input and at least one output may be employed in Figure 1.

Figures 3, 4:
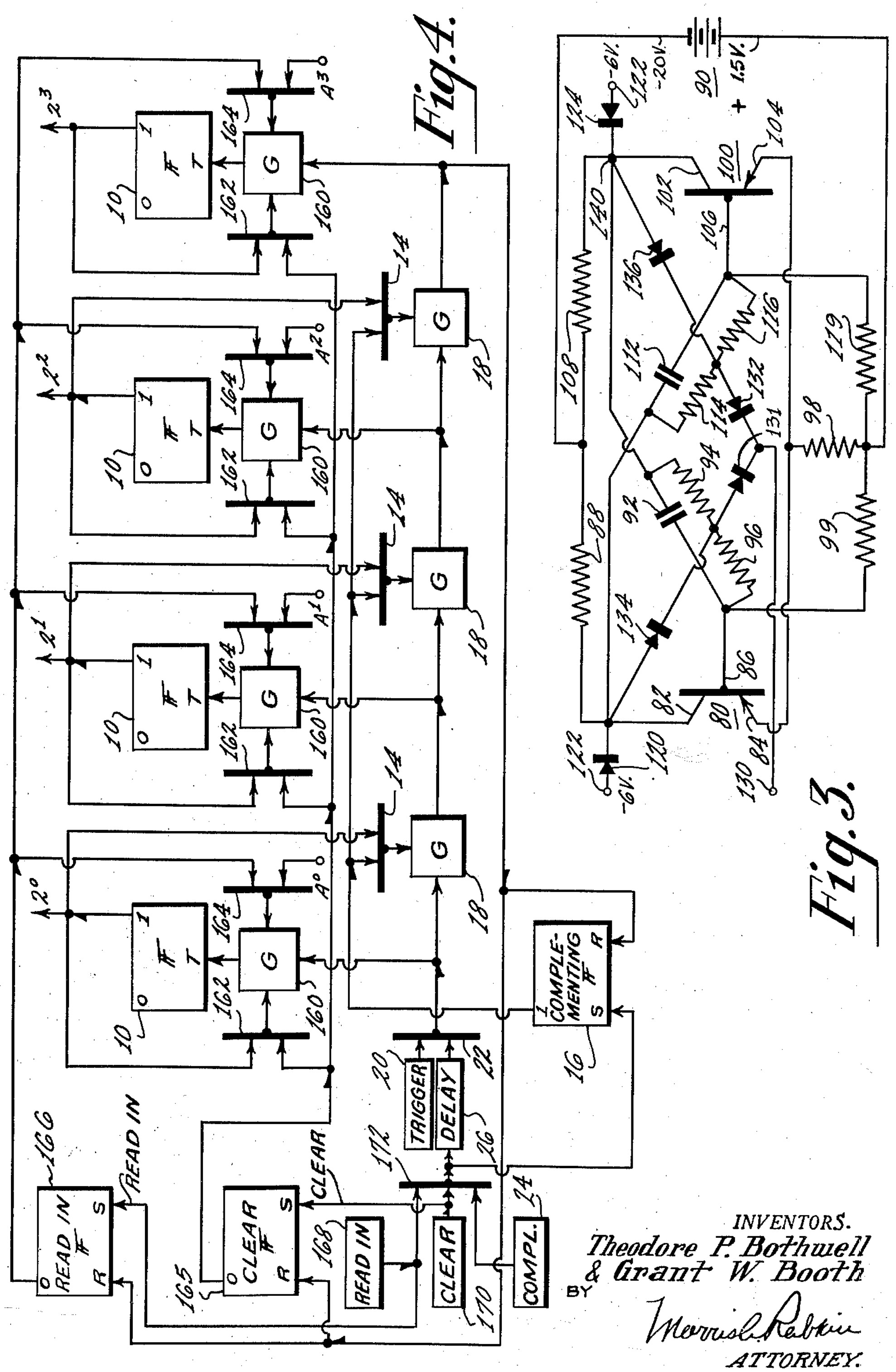
Figure 3 is a circuit diagram of a transistor flip-flop which may be employed in the block diagram of Figure 1; and, Figure 4 is a block diagram of a counter, in accordance with this invention.

In Figure 3, a pair of transistors 80 and 100 are shown connected in a known flip-flop circuit. These transistors are illustrated as P–N–P junction type transistors. Each of the transistors has a collector 82, 102, an emitter 84, 104, and a base 86, 106, respectively. The collector 82 of the left-hand transistor 80 is connected through a resistor 88 to the negative terminal of a source of potential 90. The collector 82 is also connected through a cross coupling network to the base electrode 106 of the transistor 100. The cross coupling network comprises a capacitor 112 connected in parallel to serially connected resistors 114 and 116. The source 90 may, for example, be a battery, the positive terminal of which is coupled through a resistor 98 to the emitter electrodes 84 and 104; and through resistors 99 and 119, respectively, to the base electrodes 86 and 106, respectively. The collector 82 of the left-hand transistor 80 is coupled through the cathode of a clamping diode 120 to a voltage source 122.

In a similar manner, the collector 102 of the right-hand transistor 100 is coupled through the cathode of a diode 124 to a voltage source 122, through a resistor 108 to the voltage source 90, and through a cross coupling network consisting of parallel connected capacitor 92 and serially connected resistors 94 and 96 to the base electrode 86 of the left-hand transistor 80. A trigger input terminal 130 is connected through the cathodes of steering diodes 131 and 132 to the junction points between the resistors 94 and 96, and 114 and 116 in each of the cross coupling networks, respectively. Similarly, the collectors 82 and 102, respectively, are coupled through diodes 134 and 136, respectively, to the respective resistor 94—96 and 114—116 junction points in the cross coupling networks.

In the operation of the flip-flop circuit of Figure 3, assume that the left-hand transistor 80 is in conduction and conversely, the right-hand transistor 100 is not conducting. The voltage at the right-hand output terminal 140 (at the collector 102) is clamped at —6 volts by the clamping diode 124. The right-hand output terminal 140 represents the "1" output of the flip-flop. The voltage of —6 volts with respect to ground is defined for the purposes of this application to be in a "one" condition, that is, the "one" output is "high." The high "one" output is sufficient to prime the transistor gated pulse amplifier of Figure 2.

As the left-hand transistor 80 is conductive, current is flowing into the emitter electrode 84 and out of the base and collector electrodes 86 and 82, respectively. Assume now that a negative trigger input is applied to the flip-flop at terminal 130. This trigger voltage passes through the pulse steering arrangement consisting of diodes 131 and 132, and diodes 134 and 136, and is applied to the base 106 of the right-hand transistor 100 and to the collector 82 of the left-hand transistor 80. The right-hand transistor 100 is non-conductive due to the common emitter resistor 98 applying a reverse bias across the emitter-base diode 104, 106. On receiving the negative pulse, transistor 100 becomes forward biased and starts conducting. The additional current drawn through the common emitter resistor 98 by the right-hand transistor 100 decreases the forward bias of the emitter-base junction of the left-hand transistor 80, thereby tending to effect cutoff of the left-hand transistor 80. The collector 102 of the right-hand transistor 100 starts to rise in voltage toward the potential of the battery 90 due to current flow through the right-hand collector resistor 108. This rise in voltage at the collector electrode 102 is passed through the cross coupling network 92, 94, 96 to the base 86 of the left-hand transistor 80. These actions are cumulative and in a short period of time the transistors have reversed their state of conduction. The right hand transistor 100 is now in conduction and the left-hand transistor 80 is cutoff. The collector electrode 102 of the right-hand transistor 100 is now raised in voltage value (i. e. in a positive direction) and the "one" output terminal 140 is "low."

The pulse steering arrangement consisting of the diodes 131, 132, 134 and 136 operates to reduce the saturating effects of the trigger pulse at large trigger amplitudes. The feedback diode (134 or 136) serves to provide a shunt path from the base 86 or 106 through the respective feedback resistors 96 or 116 to the collector of the conducting transistor. Hence, any negative trigger pulses are shunted away from the base to the collector of the conducting transistor. Stated in another manner, the collector voltage is lowered by an amount corresponding to the base voltage so that the effect of the trigger is decreased and the conducting transistor is not driven into saturation. The speed of the flip-flop in changing state is thereby increased.

For the cutoff transistor, the feedback diode 134 or 136 is reverse biased and has no effect upon the circuit operation. It should be noted that the feedback diode, as used in this circuit, does not provide an anti-saturation clamp. Some fixed current will flow through the feedback resistors 96 and 116 because of the essentially constant forward bias drop of the diode. D. C. (direct current) stability is not sacrificed by the use of feedback diodes and the speed and operation of the circuit is increased since the storage effects resulting from saturation are reduced.

In Figure 4, a block diagram of certain modifications of the reversible counter of Figure 1 are shown whereby this reversible counter may be made to operate selectively either as a counter or as a register utilizing the same two basic circuits used in Figure 1, namely, a gate and a flip-flop. As in Figure 1, a four-stage counter-register having a flip-flop 10 for each of the binary stages $2^0$, $2^1$, $2^2$, and $2^3$ is shown. A source of trigger pulses 20 again is coupled through an "or" circuit 22 and through a series of high speed carry gates 18. The output of the last carry gate 18 of the counter is returned to the reset input of a complementing flip-flop 16. Each of the carry gates 18 is primed through the output of a different "or" circuit 14. The "1" output of each different flip-flop 10 and the "1" output of the complementing flip-flop 16 are the inputs to each different "or" circuit 14, as in the arrangement of Figure 1. The set input of the complementing flip-flop 16 is received as above from a complementing pulse source 24 whose output is also applied through the delay 26 to the "or" circuit 22. In this case, however, instead of being coupled directly to the respective trigger inputs of each of the flip-flops 10, the output of the "or" circuit 22 and the output of each of the high speed carry gates 18 are coupled through three-input "and" gate 160 to these trigger inputs.

The second input of each of the gates 160 is received from the output of "or" circuits 162. "Or" circuits 162 each have two inputs, one from the "one" output of a respective one of the flip-flops 10, the other from the "zero" output of a clear flip-flop 165. The clear flip-flop 165 may be of the same type as the complementing flip-flop 16.

The third input to each of the gates 160 is provided by the output of a different one of two-input "or" circuits 164. One input to the "or" circuits 164 is from the successively ordered taps, respectively, A0, A1, A2, and A3. These inputs may be derived, for example, from the successive binary stages, $2^0$, $2^1$, $2^2$, and $2^3$, of another register or other well known input device, such as from magnetic tape reading heads. The second input to each of the gates 164 is received from the "zero" output of a read-in flip-flop 166. The reset input of the complementing flip-flop 16, the clearing flip-flop 165, and the read-in flip-flop 166 is received from the output of the third high speed carry gate 18. A read-in pulse source 168 and a clearing pulse source 170 are provided. These pulse sources 168 and 170 may be any source or voltage level from which the desired control voltage or pulse for setting a flip-flop or priming an "and" gate may be obtained. These sources may, for example, be from the program control unit of a computing system.

The complementing source 24, the read-in source 168, and the clearing source 170 are coupled through an "or" gate 172 to the set input of the complementing flip-flop 16 and to the input of the delay unit 26. The set input of the clearing flip-flop 165 and the set input of the read-in flip-flop 166 are received, respectively, from the clearing pulse source 170 and the read-in pulse source 168.

In operation, the counter of Figure 4 may be operated as a counter, by the insertion of successive pulses to be counted from the trigger source 20 and by the successive complementation for reverse counting and read out by control pulses from the complementing pulse source 24. The counter of Figure 4 has additional features. The counter of Figure 4 may store a given binary number or clear itself to zero, under the control of the read-in pulse source 168 and the clearing pulse source 170, respectively.

Consider first the clearing operation. When a clear pulse from the clear pulse source 170 sets the complementing flip-flop 16, a pulse is introduced through the delay unit 26 for subsequent passage through the high speed carry gates 18. At the same time, the clearing flip-flop 165 is set. The priming input through "or" circuits 162 to each of the trigger input gates 160 derived from the "zero" output of the clear flip-flop 165 is removed. The priming input to each of the gates 160 from the "or" circuits 164 is continuously present because the read-in flip-flop 166 remains in the reset condition. After the delay interval, the clear pulse passes out of the delay unit 26 through "or" circuit 22 and through the high speed carry gate 18. Only those trigger input gates 160 associated with a flip-flop 10 having a high "one" output are primed and thereby pass this high speed carry pulse. Thus if the $2^0$ and $2^2$ flip-flops were in a "1" condition only these $2^0$ and $2^1$ flip-flops would receive the read-in pulse at their trigger input to effect a reversal thereof. Upon the passage through each of the gates 18, the delayed read-in pulse returns, in a manner similar to that described in connection with Figure 1, to reset the complementing flip-flop 16 and the clearing flip-flop 165.

The read-in binary number from some other unit (not shown) whose outputs are coupled to each of the registers inputs A0, A1, A2, and A3, respectively, may be initiated by a pulse from the read-in pulse source 168. Assume that the counter has been cleared. Each of the flip-flops 10 is in the reset condition. Complementing flip-flop 16 is set by the read-in pulse. Each of the high speed carry gates 18 is now primed. At the same time, the read-in pulse sets the read-in flip-flop 166. The priming inputs to each of the gates 160 from the read-in flip-flop 166 is removed. A first priming input to each of the gates 160 is provided by the "0" output of the clearing flip-flop 165. The delayed read-in pulse passes through the delay unit 26, "or" circuit 22, and through the high speed carry gates 18 to provide a second input to each of the gates 160. The final priming input to each of the gates 160 is from the inputs A0, A1, A2, and A3. Those gates 160 which have a binary "one" on their respective A0 to A4 inputs pass this read-in pulse to the trigger input of each of the flip-flops, thereby reversing their individual states of operation. Thus, each of those channels A0, A1, A2, and A3 which contained signals representing binary "one" pass the read-in pulse to the respective flip-flops 10. The binary "ones" on the inputs are registered in the respective flip-flop. Upon the passage of the pulse through the high speed carry gates 18, the output resets the complementing flip-flop 16 and the read-in flip-flop 166. The counter is now ready to count further pulses from the trigger 20.

There has thus been described a counter having a high speed carry. By the use of a complementing arrangement the counter is made reversible. Further, the counter may be made to operate as a register having clearing and parallel read-in functions by the use of a small amount of additional circuitry. The reversible counter and register may be constructed using only a few standardized types of component parts. Also a novel triggering technique for a transistorized flip-flop is disclosed.

What is claimed is:

1. An impulse responsive circuit comprising a plurality of flip-flops, each of said flip-flops having at least one output and a trigger input, a plurality of coincidence means connected in cascade, successive ones of said means connected to and responsive to the preceding means, each of said means being additionally connected to and responsive to a different one of said flip-flop outputs, each of said flip-flop trigger inputs being connected to and responsive to a different one of said coincidence means, and means for priming said coincidence means.

2. An impulse responsive circuit comprising a plurality of flip-flops, each of said flip-flops having at least one output and a trigger input, a plurality of coincidence gates connected in cascade and each having three inputs, and priming means, successive ones of said gates having their first inputs connected to the output of the preceding gate, each of the second inputs of said coincidence gates being connected to and responsive to a different one of said flip-flop outputs and each of the third inputs of said gates also being connected to and responsive to priming means, each of said flip-flop trigger inputs being connected to and responsive to a different one of said coincidence means.

3. A reversible counter comprising a plurality of flip-flops, each of said flip-flops having at least one output and a trigger input, a plurality of coincidence means connected in cascade without the intervention of said flip-flops, and a complementing flip-flop having at least one steady state output, each of said coincidence means being responsive alternatively to said complementing flip-flop output and to a different one of said plurality of flip-flop outputs, each of said flip-flop trigger inputs being connected to and responsive to a different one of said coincidence means.

4. A reversible counter comprising a plurality of flip-flops, each of said flip-flops having at least one output and a trigger input, a plurality of coincidence means connected in cascade without the intervention of said flip-flops, and a complementing flip-flop having reset and set inputs and at least one steady state output corresponding to said set input, each of said coincidence means being responsive alternatively to said complementing flip-flop output and to a corresponding one of said plurality of flip-flop outputs, each of said flip-flop trigger inputs being connected to and responsive to a different one of said coincidence means.

5. A reversible counter comprising a plurality of flip-flops, each of said flip-flops having at least one output and a trigger input, a plurality of "and" gates connected in cascade, and a complementing flip-flop having reset and set inputs and at least one steady state output corresponding to said set input, each of said "and" gates connected to be responsive alternatively to said complementing flip-flop output and to a different one of said plurality of flip-flop outputs, said reset input of said complementing flip-flop being connected to and responsive to the last one of said cascaded "and" gates, each of said flip-flop trigger inputs being connected to and responsive to a different one of said "and" gates.

6. A reversible counter comprising a plurality of flip-flops, each of said flip-flops having a trigger input and only one output, means for receiving complementing signals, complementing means responsive to said complementing signal receiving means, a plurality of cascaded coincidence gates, and means for receiving signals to be counted, each of said gates being connected to and responsive to said complementing means and each of said gates also being connected to and responsive to a different one excluding the last one of said flip-flop outputs, the first one of said gates being responsive alternatively to said complementing signal receiving means and to said signal receiving means, and each of said flip-flop trigger inputs being connected to and responsive to a different one of said coincidence means.

7. A reversible counter comprising a plurality of flip-flops, each of said flip-flops having a trigger input and an output, means for receiving complementing signals, complementing means responsive to said complementing signal receiving means, a plurality of cascaded coincidence gates, a source of signals to be counted, each of said flip-flop trigger inputs being connected to and responsive to a corresponding one of said coincidence means, each of said gates being connected to and responsive to said complementing means and each of said gates also being connected to and responsive to a corresponding different one, excluding the last one, of said flip-flop outputs, a delay means, said delay means having an input and an output, said delay means input being coupled to said complementing signal receiving means, and the first one of said gates being responsive alternatively to said delay means output and to said source of signals to be counted, whereby a reversible counter is obtained.

8. A binary reversible counter comprising a plurality of cascaded stages, each of said stages excluding the last being iterative and including two packaged components, a flip-flop and a coincidence gate, said last stage including said flip-flop, each of said flip-flops having at least one output and a trigger input, said gate having an output, each said gate and each said flip-flop trigger input being connected to and responsive to said gate output of a preceding one of said stages, and complementing means, said gate of each said stage also being connected to be alternatively responsive to said complementing means and to said stage flip-flop output, the flip-flop trigger input and gate of the first one of said stages being connected to and responsive to a source of pulses to be counted.

9. A binary reversible counter comprising a plurality of cascaded stages, each of said stages excluding the last being iterative and including two standardized components, a flip-flop and a gated pulse amplifier, said last stage including said flip-flop, each of said flip-flops having at least one output and a trigger input, said gated pulse amplifier having an output, each said gated pulse amplifier and each said flip-flop trigger input being connected to and responsive to said gated pulse amplifier output of a preceding one of said stages, and complementing means, said gated pulse amplifier of each said stage also being connected to be alternatively responsive to said complementing means and to said corresponding stage flip-flop output, said flip-flop trigger input and gated pulse amplifier of the first one of said stages being connected to and responsive to a source of pulses to be counted and to said complementing means.

10. A binary reversible counter comprising a plurality of cascaded stages, each of said stages excluding the last being iterative and including two standardized components, a flip-flop and a gated pulse amplifier, said last stage including said flip-flop, each of said flip-flops having at least one output and a trigger input, said gated pulse amplifier having an output, each said gated pulse amplifier and each said flip-flop trigger input being connected to and responsive to said gated pulse amplifier output of a preceding one of said stages, and complementing means, said gated pulse amplifier of each said stage also being connected to be alternatively responsive to said complementing means and to said corresponding stage flip-flop output, said flip-flop trigger input and gated pulse amplifier of the first one of said stages being connected to and responsive to a source of pulses to be counted and to said complementing means, said complementing means being connected to and responsive to said gate output of the next to last one of said counter stages.

11. An impulse responsive circuit comprising a plurality of flip-flops, each of said flip-flops having at least one output and a trigger input, a plurality of coincidence means connected directly in cascade, each one of said plurality of coincidence means having an input coupled to a different one of said flip-flop outputs, each of said flip-flop trigger inputs being coupled to a different one of said coincidence means, and means for priming all of said coincidence means.

12. A reversible counter comprising a plurality of flip-flops, each of said flip-flops having at least one output and a trigger input, a plurality of coincidence means connected in cascade, and a complementing flip-flop having reset and set inputs and at least one steady state output corresponding to said set input, each of said coincidence means being coupled to said complementing flip-flop output and each of said coincidence means also being coupled to a different one of said plurality of flip-flop outputs, said complementing flip-flop reset input being coupled to the last one of said cascaded coincidence means, each of said flip-flop trigger inputs being coupled to a different one of said coincidence means.

13. An impulse responsive device comprising a plurality of binary stages, said device being constructed from a plurality of only two basic standardized components, a flip-flop and a gate, said flip-flop having at least one output and a trigger input, said gate having at least an output, each of said binary stages being iterative and including one of said basic flip-flops and a first and a second one of said basic gates, the output of said first basic gate being coupled to said flip-flop trigger input in each of said stages, each one of said second basic gates being connected in cascade, said first basic gate of each said stage being coupled to said second basic gate of that said stage thereby coupling as a high speed carry each of said binary stages, means for receiving complementing signals for reversing the bistable condition of each of said flip-flops, complementing means connected to and responsive to said complementing signal receiving means, in each said stage said second basic gate being coupled to said complementing means and to said flip-flop output, read-in means, and clearing means, each of said first basic gates also being coupled to said clearing means and said read-in means to register voltages representing numbers in said device.

14. An impulse responsive device comprising a plurality of binary stages, said device being constructed from a plurality of only two basic standardized components, a flip-flop and a gated pulse amplifier, said flip-flop having at least one output and a trigger input, said gated pulse amplifier having at least an output, each of said binary stages being iterative and including one of said basic flip-flops and a first and a second one of said basic gated pulse amplifiers, the output of said first basic gated pulse amplifier being coupled to said flip-flop trigger input in each of said stages, each one of said second basic gated pulse amplifiers being connected in cascade, said first basic gated pulse amplifier of each said stage being coupled to and responsive to said second basic gated pulse amplifier of that said stage thereby coupling as a high speed carry each of said binary stages, a source of complementing signals for reversing the bistable condition of each of said flip-flops, complementing means coupled to and responsive to said complementing signal source, in each said stage said second gated pulse amplifiers being responsive to said complementing means and also being responsive to said flip-flop output, read-in means, and clearing means, in each said stage said first basic gated pulse amplifier being coupled to and responsive to said clearing means and said read-in means to register voltages representing numbers in said device.

15. An impulse responsive device as claimed in claim 14 wherein said first gated pulse amplifier of each of said stages is responsive alternatively to said clearing means and to said corresponding stage flip-flop output and alternatively to said read-in means and to said voltages representing numbers.

16. An impulse responsive device as claimed in claim 14 wherein said read-in means and said clearing means include a flip-flop having at least an output and a set and a reset input, said reset input being connected to and responsive to said second basic gated pulse amplifier output of the next to last one of said stages.

17. A reversible counter-register comprising a plurality of binary stages, said counter being constructed from a plurality of only two basic standardized components, a flip-flop and a gated pulse amplifier, said flip-flop having at least one output and a trigger input, said gated pulse amplifier having at least an output, each of said binary stages except the first being iterative and including one of said basic flip-flops and a first and a second one of said basic gated pulse amplifiers, the output of said first basic gated pulse amplifier being coupled to said flip-flop trigger input in each of said stages, each one of said second basic gated pulse amplifiers being connected in cascade, said first basic gated pulse amplifier of each said stage except the first being responsive to said second basic gated pulse amplifier of that said stage thereby coupling as a high speed carry each of said binary stages, a source of complementing signals for reversing the bistable condition of each of said flip-flops, complementing means responsive to said complementing signal source, in each said stage said second gated pulse amplifiers being responsive alternatively to said complementing means and said flip-flop output, signal means representing binary digits, read-in means, clearing means, in each said stage said first basic gated pulse amplifier being responsive to the coincidence of (1) alternatively each said binary stage flip-flop output and said clearing means and (2) alternatively to said signal means representing digits and said read-in means whereby said counter-register selectively operates as a counter and as a register, and whereby binary numbers are entered into said register under control of said read-in means, said register is cleared by the operation of said clearing means, and said counter is bidirectional under the control of said complementing means.

18. A reversible counter comprising a plurality of flip-flops, each of said flip-flops having a trigger input and an output, means for receiving complementing signals, complementing means responsive to said complementing signal receiving means, a plurality of cascaded coincidence gates, each of said flip-flop trigger inputs being connected to and responsive to a corresponding one of said coincidence means, each of said gates being connected to and responsive to said complementing means and each of said gates also being connected to and responsive to a corresponding different one, excluding the last one, of said flip-flop outputs, a delay means, said delay means having an input and an output, said delay means input being coupled to said complementing signal receiving means, and the first one of said gates being responsive alternatively to said delay means output and to a source of signals to be counted, whereby a reversible counter is obtained.

References Cited in the file of this patent

UNITED STATES PATENTS

| | | |
|---|---|---|
| 2,703,202 | Cartwright | Mar. 1, 1955 |
| 2,750,114 | Crosman | June 12, 1956 |

OTHER REFERENCES

"Electronic Circuits of the NAREC Computer" by Sherertz in Proceedings of the I. R. E., October 1953, Figs. 8 and 9 of page 1317 pertinent.